(12) United States Patent
Abe et al.

(10) Patent No.: US 10,056,614 B2
(45) Date of Patent: Aug. 21, 2018

(54) POLYIMIDE BINDER FOR POWER STORAGE DEVICE, ELECTRODE SHEET USING SAME, AND POWER STORAGE DEVICE

(71) Applicant: UBE INDUSTRIES, LTD., Ube-shi (JP)

(72) Inventors: Koji Abe, Ube (JP); Shuichi Koso, Yamaguchi (JP); Takeshige Nakayama, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 135 days.

(21) Appl. No.: 15/024,493

(22) PCT Filed: Sep. 25, 2014

(86) PCT No.: PCT/JP2014/075380
§ 371 (c)(1),
(2) Date: Mar. 24, 2016

(87) PCT Pub. No.: WO2015/046304
PCT Pub. Date: Apr. 2, 2015

(65) Prior Publication Data
US 2016/0233513 A1 Aug. 11, 2016

(30) Foreign Application Priority Data
Sep. 26, 2013 (JP) ................. 2013-200389

(51) Int. Cl.
| | |
|---|---|
| *H01M 2/00* | (2006.01) |
| *H01M 4/62* | (2006.01) |
| *H01M 4/08* | (2006.01) |
| *H01M 4/131* | (2010.01) |
| *H01M 4/1391* | (2010.01) |
| *H01M 10/0525* | (2010.01) |
| *H01M 6/14* | (2006.01) |
| *H01G 11/30* | (2013.01) |
| *H01G 11/38* | (2013.01) |
| *H01G 11/50* | (2013.01) |
| *C08G 73/10* | (2006.01) |

(Continued)

(52) U.S. Cl.
CPC ........ *H01M 4/622* (2013.01); *C08G 73/1082* (2013.01); *H01G 11/30* (2013.01); *H01G 11/38* (2013.01); *H01G 11/46* (2013.01); *H01G 11/50* (2013.01); *H01G 11/54* (2013.01); *H01G 11/68* (2013.01); *H01M 4/08* (2013.01); *H01M 4/131* (2013.01); *H01M 4/1391* (2013.01); *H01M 6/14* (2013.01); *H01M 10/0525* (2013.01); *H01M 10/0567* (2013.01); *H01M 10/0568* (2013.01); *H01M 2300/0025* (2013.01); *Y02E 60/13* (2013.01); *Y02T 10/7011* (2013.01); *Y02T 10/7022* (2013.01)

(58) Field of Classification Search
CPC ..................................................... H01M 2/00
See application file for complete search history.

(56) References Cited

U.S. PATENT DOCUMENTS

| | | |
|---|---|---|
| 2002/0076611 A1 | 6/2002 | Palazzo et al. |
| 2011/0151338 A1 | 6/2011 | Yamamoto et al. |

(Continued)

FOREIGN PATENT DOCUMENTS

| | | |
|---|---|---|
| JP | 6-163031 A | 6/1994 |
| JP | 2000-21412 A | 1/2000 |

(Continued)

OTHER PUBLICATIONS

International Search Report dated Nov. 18, 2014, in PCT/JP2014/075380 filed Sep. 25, 2014.

(Continued)

*Primary Examiner* — Jacob Marks
(74) *Attorney, Agent, or Firm* — Oblon, McClelland, Maier & Neustadt, L.L.P.

(57) ABSTRACT

Provided are a polyimide binder for energy storage device capable of improving properties of an energy storage device in a broad temperature range, and an electrode sheet and an energy storage device using the same. The polyimide binder for energy storage device, which is a polyimide obtained by subjecting an aqueous solution of a polyamic acid composed of a repeating unit represented by the following general formula (I) to an imidization reaction, the polyimide having a tensile elastic modulus of 1.5 GPa or more and 2.7 GPa or less.

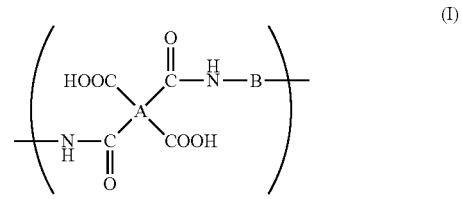

In the formula, A is a tetravalent group resulting from eliminating a carboxyl group from a specified tetracarboxylic acid, and B is a divalent group resulting from eliminating an amino group from a specified diamine, provided that 55 mol % or more of B in a total amount of the repeating unit is the divalent group resulting from eliminating an amino group from an aliphatic diamine having a molecular weight of 500 or less.

20 Claims, No Drawings

(51) Int. Cl.
  *H01G 11/46* (2013.01)
  *H01G 11/54* (2013.01)
  *H01G 11/68* (2013.01)
  *H01M 10/0567* (2010.01)
  *H01M 10/0568* (2010.01)

(56) References Cited

U.S. PATENT DOCUMENTS

| | | | |
|---|---|---|---|
| 2013/0171520 A1* | 7/2013 | Nakayama | C08G 73/1067 429/211 |
| 2014/0218875 A1 | 8/2014 | Nakayama et al. | |
| 2014/0363687 A1 | 12/2014 | Nakayama et al. | |

FOREIGN PATENT DOCUMENTS

| | | |
|---|---|---|
| JP | 2000-297152 A | 10/2000 |
| JP | 2002-260668 A | 9/2002 |
| JP | 2007-149604 A | 6/2007 |
| JP | 2008-34352 A | 2/2008 |
| JP | 2011-137063 A | 7/2011 |
| JP | 2012-204203 A | 10/2012 |
| JP | 2012-207196 A | 10/2012 |
| WO | WO 2004/004031 A1 | 1/2004 |
| WO | WO 2010/021236 A1 | 2/2010 |
| WO | WO 2010/150513 A1 | 12/2010 |
| WO | WO 2013/035806 A1 | 3/2013 |
| WO | WO 2013/042610 A1 | 3/2013 |
| WO | WO 2013/105610 A1 | 7/2013 |
| WO | WO 2013/114788 A1 | 8/2013 |

OTHER PUBLICATIONS

Extended European Search Report dated Mar. 28, 2017 in Patent Application No. 14849332.3.

* cited by examiner

POLYIMIDE BINDER FOR POWER STORAGE DEVICE, ELECTRODE SHEET USING SAME, AND POWER STORAGE DEVICE

TECHNICAL FIELD

The present invention relates to a polyimide binder for energy storage device capable of improving properties of an energy storage device in a broad temperature range, and an electrode sheet and an energy storage device using the same.

BACKGROUND ART

An energy storage device, especially a lithium secondary battery, has been widely used recently for a power source of a small-sized electronic device, such as a mobile telephone, a notebook personal computer, etc., and a power source for an electric vehicle or electric power storage. Since there is a possibility that such an electronic device or a vehicle is used in a broad temperature range, such as a high temperature in midsummer, a low temperature in an extremely cold region, etc., it is demanded to improve battery characteristics with a good balance in a broad temperature range.

In order to improve an energy density of a lithium secondary battery, alloy-based negative electrode active materials containing silicon, tin, or the like, which has a very large theoretical capacity capable of absorbing and releasing lithium as compared with graphite that is a negative electrode active material most widely used at present, are eagerly studied. However, since when such an alloy-based material absorbs lithium, it causes large volume expansion, the active material is broken and pulverized. Therefore, such an alloy-based material involves such a problem that current collection properties are worsened, or the electrode is liable to expand. In addition, on an active newly formed surface generated due to a crack of the active material, a nonaqueous electrolytic solution is liable to be decomposed. Therefore, there was involved such a problem that decomposed products of the nonaqueous electrolytic solution deposit on the active material surface to cause an increase of resistance or the battery is liable to expand due to the gas generation.

In addition, it is known that on the occasion of using such an alloy-based negative electrode active material for an electrode, when a high-strength resin, such as a polyimide, etc., is used, the cycle property is improved. However, in general, it is necessary to use a polyamic acid (polyimide precursor) dissolved in an organic solvent, such as 1-methyl-2-pyrrolidone, etc., and there was involved such a problem that an equipment for recovering the organic solvent at the time of producing an electrode or for heating to a high temperature of 200° C. or higher to thoroughly achieve imidization has to be introduced, so that an increase in cost is inevitable.

PTL 1 describes a secondary battery having a negative electrode including a carbon powder capable of absorbing and releasing cations, which is integrated with a binder consisting essentially of a polyimide resin.

PTLs 2 to 4 disclose a lithium secondary battery including a negative electrode having an active material layer containing an active material composed of a silicon alloy, an alloy containing tin, or the like and a binder, wherein a polyimide resin whose mechanical properties, such as a tensile elastic modulus, etc., fall within specified ranges is used as the binder. However, PTLs 2 to 4 do not describe a specific chemical structure of the polyimide resin to be used.

PTL 5 discloses a lithium secondary battery including a negative electrode having a negative electrode active material layer formed on a surface of a negative electrode collector, the negative electrode active material layer containing negative electrode active material particles containing silicon and/or silicon alloy particles and a binder; a positive electrode; and a separator, wherein the binder contains a polyimide resin having a specified chemical structure. This polyimide resin is a polyimide having a 3,3',4,4'-benzophenone tetracarboxylic acid residue.

PTL 6 discloses a nonaqueous electrolytic solution secondary battery, in which a binder of an active material of at least one of a negative electrode and a positive electrode is a polyimide resin, and an elastic modulus of the polyimide resin is 500 to 3,000 MPa, and describes that the cycle property or a capacity storage rate after charging storage is improved.

CITATION LIST

Patent Literature

PTL 1: JP-A 6-163031
PTL 2: WO 2004/004031A
PTL 3: JP-A 2007-149604
PTL 4: WO 2010/150513A
PTL 5: JP-A 2008-034352
PTL 6: JP-A 2000-021412

SUMMARY OF INVENTION

Technical Problem

A technical problem of the present invention is to provide a polyimide binder for energy storage device capable of improving properties of an energy storage device in a broad temperature range, and an electrode sheet and an energy storage device using the same.

Solution to Problem

The present inventors studied details of performances of polyimide binders for lithium secondary battery of the aforementioned background art. As a result, it was the actual situation that a sufficient effect against the problem of improving battery characteristics in a broad temperature range, such as an improvement of low-temperature properties or inhibition of gas generation after high-temperature storage, etc., cannot be exhibited.

In addition, in all of the aforementioned patent literatures, on the occasion of producing an electrode using a polyimide binder for lithium secondary battery, the organic solvent, such as 1-methyl-2-pyrrolidone, etc., was used as the solvent for dissolving a polyamic acid.

Then, in order to solve the aforementioned problem, the present inventors made extensive and intensive investigations. As a result, it has been found that by using a polyimide binder for energy storage device, that is a polyimide obtained by subjecting an aqueous solution of a polyamic acid having a specified structure to an imidization reaction, the polyimide having a tensile elastic modulus of 1.5 GPa or more and 2.7 GPa or less, it is possible to improve properties of an energy storage device, such as a lithium secondary battery, etc., in a broad temperature range, leading to accomplishment of the present invention.

Specifically, the present invention provides the following (1) to (6).

(1) A polyimide binder for energy storage device, which is obtained by subjecting an aqueous solution of a polyamic acid having a repeating unit represented by the following general formula (I) to an imidization reaction, the polyimide having a tensile elastic modulus of 1.5 GPa or more and 2.7 GPa or less.

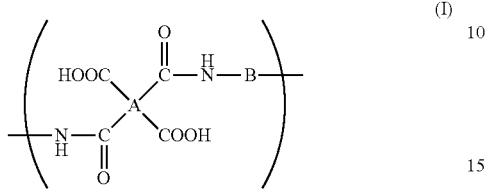

In the formula, A is one or more selected from a tetravalent group resulting from eliminating a carboxyl group from an aromatic tetracarboxylic acid not containing a fluorine group, a tetravalent group resulting from eliminating a carboxyl group from an aliphatic tetracarboxylic acid, and a tetravalent group resulting from eliminating a carboxyl group from an aromatic tetracarboxylic acid containing a fluorine group; and B is one or more selected from a divalent group resulting from eliminating an amino group from an aromatic diamine not containing a fluorine group, whose solubility in water of 25° C. is 0.1 g/L or more, a divalent group resulting from eliminating an amino group from an aliphatic diamine having a molecular weight of 500 or less, and a divalent group resulting from eliminating an amino group from an aromatic diamine containing a fluorine group, provided that 55 mol % or more of B in a total amount of the repeating unit is the divalent group resulting from eliminating an amino group from an aliphatic diamine having a molecular weight of 500 or less.

(2) A negative electrode sheet for energy storage device including a copper collector having a negative electrode active material layer formed thereon, the negative electrode active material layer being formed by casting or applying a negative electrode mixture including the polyimide binder for energy storage device as set forth the above (1), a silicon-containing negative electrode active material, and a carbon material on the copper collector surface.

(3) A positive electrode sheet for energy storage device including an aluminum collector having a positive electrode active material layer formed thereon, the positive electrode active material layer being formed by casting or applying a positive electrode mixture including the polyimide binder for energy storage device as set forth the above (1), a carbon material, and a lithium transition metal oxide, on the aluminum collector surface, wherein a proportion of a nickel atom and a manganese atom occupying in the whole of metal elements other than a lithium atom in the lithium transition metal oxide is 50 atomic % or more and 100 atomic % or less.

(4) An energy storage device including a positive electrode, a negative electrode, and a nonaqueous electrolytic solution having an electrolyte salt dissolved in a nonaqueous solvent, the negative electrode being the negative electrode sheet as set forth the above (2).

(5) Use of a polyimide binder for an energy storage device, the polyimide binder being obtained by subjecting an aqueous solution of a polyamic acid including a repeating unit represented by the foregoing general formula (I) to an imidization reaction, and having a tensile elastic modulus of 1.5 GPa or more and 2.7 GPa or less.

(6) A method for improving electrical properties of an energy storage device by using a polyimide binder obtained by subjecting an aqueous solution of a polyamic acid including a repeating unit represented by the foregoing general formula (I) to an imidization reaction, the polyimide having a tensile elastic modulus of 1.5 GPa or more and 2.7 GPa or less.

Advantageous Effects of Invention

According to the present invention, it is possible to provide a polyimide binder for energy storage device capable of improving properties of an energy storage device in a broad temperature range, especially low-temperature discharge properties and inhibition of gas generation after high-temperature storage, and an electrode sheet and an energy storage device using the same.

DESCRIPTION OF EMBODIMENTS

The present invention is concerned with the following three embodiments.
[Embodiment 1]
Polyimide binder for energy storage device
[Embodiment 2]
Electrode sheet using the aforementioned polyimide binder
[Embodiment 3]
Energy storage device including the aforementioned electrode sheet
[Embodiment 1: Polyimide Binder for Energy Storage Device]

The polyimide binder for energy storage device, especially lithium secondary battery, according to the present invention is a polyimide binder obtained by subjecting an aqueous solution of a polyamic acid having a repeating unit represented by the following general formula (I) to an imidization reaction, the polyimide having a tensile elastic modulus of 1.5 GPa or more and 2.7 GPa or less.

The aqueous solution of the polyamic acid is one in which a polyamic acid (polyimide precursor) having a repeating unit represented by the following general formula (I), which is obtained by allowing a tetracarboxylic acid component and a diamine component to react with each other, is dissolved in water.

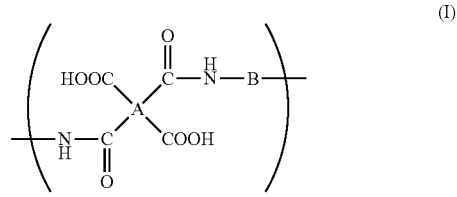

In the formula, A is one or more selected from a tetravalent group resulting from eliminating a carboxyl group from an aromatic tetracarboxylic acid not containing a fluorine group, a tetravalent group resulting from eliminating a carboxyl group from an aliphatic tetracarboxylic acid, and a tetravalent group resulting from eliminating a carboxyl group from an aromatic tetracarboxylic acid containing a fluorine group; and B is one or more selected from a divalent group resulting from eliminating an amino group from an aromatic diamine not containing a fluorine group, whose solubility in water of 25° C. is 0.1 g/L or more, a divalent group resulting from eliminating an amino group from an aliphatic diamine having a molecular weight of 500 or less, and a divalent group resulting from eliminating an amino group from an aromatic diamine containing a fluorine group, provided that 55 mol % or more of B in a total amount of the repeating unit is the divalent group resulting from eliminating an amino group from an aliphatic diamine having a molecular weight of 500 or less.

Although the reasons why the polyimide binder for energy storage device of the present invention is able to improve properties of an energy storage device in a broad temperature range, especially low-temperature discharge properties and inhibition of gas generation after high-temperature storage, are not necessarily clear, the following may be considered.

Since the electrode active material, a surface of which has polarity, and the aqueous solution of the polyamic acid are compatible with each other, it may be considered that the resulting binder firmly adheres to the electrode active material surface efficiently even under heat drying conditions at a relatively low temperature as 200° C. or lower. Moreover, since the polyimide binder for energy storage binder of the present invention has moderate flexibility, it is able to expand and contract following expansion and shrinkage accompanying charge and discharge of the electrode active material, so that a side reaction between the electrode active material and the nonaqueous electrolytic solution during charging and discharging can be efficiently inhibited. For this reason, it can be conjectured that it is possible to conspicuously improve properties of the energy storage device in a wide temperature range, such as low-temperature properties and inhibition of gas generation after high-temperature storage, etc.

The polyimide which is used in the present invention can be produced by allowing a tetracarboxylic acid component and a diamine component to react with each other to produce a polyamic acid that is a precursor of the polyimide and subjecting this polyamic acid to dehydration and cyclization (imidization) by heating or using a catalyst. Preferably, the polyimide which is used in the present invention can be produced by allowing a tetracarboxylic acid component (tetracarboxylic anhydride) and a diamine component to react with each other by using water as a reaction solvent in the presence of an imidazole, to produce an aqueous solution of a polyamic acid and heating this aqueous solution of a polyamic acid to achieve an imidization reaction.

The polyamic acid, the polyimide, and the like which are used in the present invention are hereunder described.

[Tetracarboxylic Acid Component]

The tetracarboxylic acid component of the polyamic acid which is used in the present invention is preferably one or more selected from an aromatic tetracarboxylic dianhydride not containing a fluorine group, an aliphatic tetracarboxylic dianhydride, and an aromatic tetracarboxylic dianhydride containing a fluorine group.

(Aromatic Tetracarboxylic Dianhydride not Containing a Fluorine Group)

As the aromatic tetracarboxylic dianhydride not containing a fluorine group, there may be suitably exemplified compounds having 2 to 3 aromatic rings, for example, 3,3',4,4'-biphenyl tetracarboxylic dianhydride, 2,3,3',4'-biphenyl tetracarboxylic dianhydride, 2,2',3,3'-biphenyl tetracarboxylic dianhydride, pyromellitic dianhydride, benzophenone tetracarboxylic dianhydride, 4,4'-oxydiphthalic dianhydride, diphenylsulfone tetracarboxylic dianhydride, p-terphenyl tetracarboxylic dianhydride, m-terphenyl tetracarboxylic dianhydride, etc. Of those, 3,3',4,4'-biphenyl tetracarboxylic dianhydride and 4,4'-oxydiphthalic dianhydride are more preferred.

(Aliphatic Tetracarboxylic Dianhydride)

As the aliphatic tetracarboxylic dianhydride, there may be suitably exemplified 1,2,3,4-cyclobutane tetracarboxylic dianhydride, 1,2,4,5-cyclohexane tetracarboxylic 1,2:4,5-dianhydride, dicyclohexyl-3,3',4,4'-tetracarboxylic dianhydride, and bicyclo[2.2.2]oct-7-ene-2,3:5,6-tetracarboxylic dianhydride. Of those, 1,2,4,5-cyclohexane tetracarboxylic 1,2:4,5-dianhydride and dicyclohexyl-3,3',4,4'-tetracarboxylic dianhydride are more preferred.

(Aromatic Tetracarboxylic Dianhydride Containing a Fluorine Group)

As the aromatic tetracarboxylic dianhydride containing a fluorine group, there may be suitably exemplified compounds having 2 to 3 aromatic rings, such as 4,4'-(hexafluoroisopropylidene)diphthalic anhydride, 3,3'-(hexafluoroisopropylidene)diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene]diphthalic anhydride, 1H-diflo[3,4-b:3',4'-i]xanthene-1,3,7,9(11H)-tetron, 5,5'-oxybis[4,6,7-trifluoropyromellitic anhydride], 3,6-bis(trifluoromethyl)pyromellitic dianhydride, 4-(trifluoromethyl)pyromellitic dianhydride, 1,4-difluoropyromellitic dianhydride, 1,4-bis(3,4-dicarboxytrifluorophenoxy)tetrafluorobenzene dianhydride, etc. Of those, 4,4'-(hexafluoroisopropylidene)diphthalic anhydride is more preferred.

The aforementioned tetracarboxylic dianhydrides are each not always required to be used solely but may be used as a mixture of two or more thereof.

Among the aforementioned tetracarboxylic dianhydrides, those having a divalent connecting chain selected from an ether bond (—O—) and an alkylene chain (—$CH_2$—) in at least a part of a substituent connecting the two carboxylic dianhydrides are preferred because they are able to improve the flexibility of the polyimide. A proportion of the tetracarboxylic dianhydride having a divalent connecting group selected from an ether bond (—O—) and an alkylene chain (—$CH_2$—), which occupies in the tetracarboxylic dianhydride, is preferably 55 mol % or more, more preferably 60 mol % or more, still more preferably 70 mol % or more, and especially preferably 80 mol % or more.

Specifically, one or more selected from 4,4'-oxydiphthalic dianhydride, 4,4'-(hexafluoroisopropylidene)diphthalic anhydride, 1,2,4,5-cyclohexane tetracarboxylic 1,2:4,5-dianhydride, and dicyclohexyl-3,3',4,4'-tetracarboxylic dianhydride are preferred, and 4,4'-oxydiphthalic dianhydride or 1,2,4,5-cyclohexane tetracarboxylic 1,2:4,5-dianhydride is especially preferred.

In the case of using the tetracarboxylic dianhydride in the aforementioned constitution, the binder of the present invention can be provided with moderate flexibility and can conspicuously improve properties of the energy storage device in a wide temperature range, such as low-temperature properties and inhibition of gas generation after high-temperature storage, etc.

[Diamine Component]

The diamine component of the polyamic acid which is used in the present invention is one or more selected from an aromatic diamine not containing a fluorine group, whose solubility in water of 25° C. is 0.1 g/L or more, an aliphatic diamine having a molecular weight of 500 or less, and an aromatic diamine containing a fluorine group. However, a proportion of the aliphatic diamine having a molecular weight of 500 or less, preferably 400 or less, and more preferably 300 or less is 55 mol % or more, more preferably 60 mol % or more, still more preferably 70 mol % or less, especially preferably 80 mol % or more, and most preferably 100 mol %.

In the polyamic acid which is used in the present invention, though 55 mol % or more of B in a total amount of the repeating unit represented by the general formula (I) is a divalent group resulting from eliminating an amino group from an aliphatic diamine having a molecular weight of 500 or less, this meaning is the same as described above. That is, it is preferred that preferably 60 mol % or more, more preferably 70 mol % or more, still more preferably 80 mol % or more, and especially preferably 100 mol % of B in a total amount of the aforementioned repeating unit is a divalent group resulting from eliminating an amino group from an aliphatic diamine having a molecular weight of preferably 400 or less, and more preferably 300 or less.

In the case of using the aliphatic diamine in the aforementioned constitution, the binder of the present invention can be provided with moderate flexibility and can conspicuously improve properties of the energy storage device in a wide temperature range, such as low-temperature properties and inhibition of gas generation after high-temperature storage, etc.

(Aromatic Diamine not Containing a Fluorine Group)

Although the aromatic diamine not containing a fluorine group is not particularly limited so long as it has a solubility in water at 25° C. of 0.1 g/L or more, an aromatic diamine having 1 to 2 aromatic rings is preferred. In the case of using an aromatic diamine whose solubility in water of 25° C. is less than 0.1 g/L, there is a concern that it becomes difficult to obtain a uniform aqueous solution of a polyamic acid. In the case where the aromatic diamine has more than 2 aromatic rings, there is a concern that the solubility in water of 25° C. is less than 0.1 g/L. As a result, there is a concern that it becomes difficult to obtain a uniform aqueous solution of a polyamic acid.

As suitable examples of the aromatic diamine not having a fluorine group, there may be exemplified p-phenylenediamine (its solubility in water at 25° C. is 120 g/L; hereinafter the same), m-phenylenediamine (77 g/L), 4,4'-diaminodiphenyl ether (0.19 g/L), 3,4'-diaminodiphenyl ether (0.24 g/L), 4,4'-diaminodiphenylmethane (0.54 g/L), 2,4-toluenediamine (62 g/L), 3,3'-dihydroxy-4,4'-diaminobiphenyl (1.3 g/L), bis(4-amino-3-carboxyphenyl)methane (200 g/L), and 2,4-diaminotoluene (62 g/L). Of those, p-phenylenediamine, m-phenylenediamine, 4,4'-diaminodiphenyl ether, 3,4'-diaminodiphenyl ether, or a mixture thereof is more preferred, and one or more selected from p-phenylenediamine and 4,4'-diaminodiphenyl ether are still more preferred because not only they are highly soluble in water, but also the resulting polyimide has excellent properties.

(Aliphatic Diamine)

Although the aliphatic diamine is not particularly limited so long as it has a molecular weight (in the case of a monomer, its molecular weight is expressed, and in the case of a polymer, its weight average molecular weight is expressed) of 500 or less, one or more selected from an aliphatic diamine having a solubility in water of 25° C. of 0.1 g/L or more and an alicyclic diamine having 1 to 2 alicyclic rings are preferred. In the case of using an aliphatic diamine having a molecular weight of more than 500, there is a concern that it becomes difficult to obtain a uniform aqueous solution of a polyamic acid.

As suitable examples of the aliphatic diamine, there may be exemplified trans-1,4-diaminocyclohexane (1,000 g/L, molecular weight: 114), cis-1,4-diaminocyclohexane (1,000 g/L, molecular weight: 114), 1,6-hexamethylenediamine (1,000 g/L, molecular weight: 116), 1, 10-decamethylenediamine (1,000 g/L, molecular weight: 172), 1,3-bis(aminomethyl)cyclohexane (1,000 g/L, molecular weight: 142), 1,4-bis(aminomethyl)cyclohexane (999 g/L, molecular weight: 142), polyoxypropylenediamine having a weight average molecular weight of 500 or less, and the like. Of those, one or more selected from trans-1,4-diaminocyclohexane, cis-1,4-diaminocyclohexane, 1,6-hexamethylenediamine, and 1,4-bis(aminomethyl)cyclohexane are more preferred.

(Aromatic Diamine Containing a Fluorine Group)

Although the aromatic diamine containing a fluorine group is not particularly limited, an aromatic diamine containing a fluorine group and having 1 to 2 aromatic rings is preferred. In the case where the aromatic diamine containing a fluorine group is one having more than 2 aromatic rings, there is a concern that it becomes difficult to obtain a uniform aqueous solution of a polyamic acid.

As suitable examples of the aromatic diamine containing a fluorine group, there may be exemplified 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl)-4,4'-diamine, 2,2',6,6'-tetrafluoro-(1,1'-biphenyl)-4,4'-diamine, 4,4'-diaminooctafluorobiphenyl, 2,2-bis(4-aminophenyl)hexafluoropropane, 4,4'-oxybis(2,3,5,6-tetrafluoroaniline), and the like.

Among the aforementioned diamine components, one or more selected from p-phenylenediamine, 4,4'-diaminodiphenyl ether, trans-1,4-diaminocyclohexane, cis-1,4-diaminocyclohexane, 1,6-hexamethylenediamine, and 1,4-bis(aminomethyl)cyclohexane are preferred.

The aforementioned diamine components are each not always required to be used solely but may be used as a mixture of two or more thereof. However, the proportion of the aliphatic diamine having a molecular weight of 500 or less is 55 mol % or more.

The aromatic diamine not containing a fluorine group may also be used in such a manner that by combining such a diamine having a high solubility in water with other diamine, the solubility in water at 25° C. is 0.1 g/L or more in terms of the whole of the diamine components.

It is to be noted that the matter that the diamine has a solubility in water at 25° C. (solubility in water of 25° C.) of 0.1 g/L or more means that 0.1 g or more of the diamine is dissolved in 1 L (1,000 mL) of water of 25° C. The solubility in water at 25° C. means a critical amount (g) at which the instant material is dissolved in 1 L (liter) of water of 25° C. This value may be easily retrieved by SciFinder (registered trademark) that is known as a retrieval service based on data bases of Chemical Abstracts and the like. Here, among solubilities under various conditions, values at a pH of 7 as calculated by Advanced Chemistry Development (ACD/Labs) Software V11.02 (Copy right 1994-2011 ACD/Labs) were adopted.

[Imidazole]

In the present invention, in order to obtain a uniform aqueous solution of a polyamic acid, it is preferred to allow the tetracarboxylic acid component and the diamine component to react with each other in the presence of an imidazole.

As the imidazole (compound), there may be suitably exemplified a compound represented by the following general formula (II).

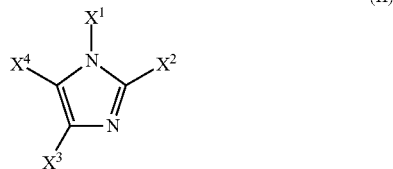

In the general formula (II), $X^1$ to $X^4$ are each independently a hydrogen atom or an alkyl group having 1 to 5 carbon atoms.

The imidazole which is used in the present invention is preferably one having a solubility in water at 25° C. of 0.1 g/L or more, and especially 1 g/L or more.

Furthermore, in the imidazole represented by the general formula (II), an imidazole in which $X^1$ to $X^4$ are each independently a hydrogen atom or an alkyl group having 1 to 5 carbon atoms, and at least two of $X^1$ to $X^4$ are an alkyl group having 1 to 5 carbon atoms, namely, an imidazole having two or more alkyl groups as substituents, is preferred.

Since the imidazole having two or more alkyl groups as substituents is high in the solubility in water, by using such an imidazole, it is possible to easily produce a uniform aqueous solution of a polyamic acid. As such an imidazole, there may be suitably exemplified one or more selected from 1,2-dimethylimidazole (its solubility in water at 25° C. is 239 g/L; hereinafter the same), 2-ethyl-4-methylimidazole (1,000 g/L), 4-ethyl-2-methylimidazole (1,000 g/L), and 1-methyl-4-ethylimidazole (54 g/L).

It is to be noted that the solubility in water at 25° C. means a critical amount (g) at which the instant material is dissolved in 1 L (liter) of water of 25° C. This value may be easily retrieved by SciFinder (registered trademark) that is known as a retrieval service based on data bases of Chemical Abstracts and the like. Here, among solubilities under various conditions, values at a pH of 7 as calculated by Advanced Chemistry Development (ACD/Labs) Software V11.02 (Copyright 1994-2011 ACD/Labs) were adopted.

The imidazole to be used may be a single material or may also be a mixture of two or more thereof.

A use amount of the imidazole which is used in the present invention is preferably 0.8 times equivalents or more, more preferably 1.0 times equivalent or more, and still more preferably 1.2 times equivalents or more based on the carboxyl group of the polyamic acid to be formed through a reaction between the tetracarboxylic dianhydride and the diamine as starting materials. When the use amount of the imidazole is less than 0.8 times equivalents based on the carboxyl group of the polyamic acid, there is a concern that it does not become easy to obtain a uniform aqueous solution of the polyamic acid. Although an upper limit of the use amount of the imidazole is not particularly limited, it is generally less than 10 times equivalents, preferably less than 5 times equivalents, and more preferably less than 3 times equivalents. When the use amount of the imidazole is too large, not only such is not economical, but also there is a concern that the storage stability of the aqueous solution of the polyamic acid is deteriorated.

In the present invention, the "equivalents based on the carboxyl group of the polyamic acid", which defines the amount of the imidazole, means the number (number of molecules) of the imidazole to be used per carboxyl group to form an amic acid group in the polyamic acid. It is to be noted that the number of carboxyl groups to form amic acid groups in the polyamic acid may be calculated on the assumption that two carboxyl groups would be formed per molecule of the tetracarboxylic acid component as the starting material.

Accordingly, the use amount of the imidazole which is used in the present invention is preferably 1.6 times moles or more, more preferably 2.0 times moles or more, and still more preferably 2.4 times moles or more relative to the tetracarboxylic dianhydride as the starting material (relative to the tetracarboxylic acid component of the polyamic acid).

The feature of the imidazole which is used in the present invention reside in the matter that not only the imidazole forms a salt with a carboxyl group of a polyamic acid (polyimide precursor) to be formed through a reaction between the tetracarboxylic dianhydride and the diamine as starting materials, thereby increasing the solubility in water, but also on the occasion of subjecting the polyimide precursor to imidization (dehydration-cyclization) to form a polyimide, an extremely high catalytic action is revealed. As a result, when the aqueous solution of the polyamic acid according to the present invention is used, for example, even by a heat treatment at a lower temperature for a shorter period of time, it becomes possible to easily obtain a polyimide binder for energy storage device having extremely high physical properties.

[Production of Aqueous Solution of Polyamic Acid]

As described above, by allowing the tetracarboxylic acid component and the diamine component to react with each other by using water as a reaction solvent in the presence of an imidazole, preferably in the presence of an imidazole having two or more alkyl groups as substituents, it is possible to directly produce an aqueous solution of a polyamic acid (hereinafter also referred to as "polyamic acid aqueous solution composition") extremely simply.

Here, the "using water as a reaction solvent" means that a main component of the solvent is water. A proportion of other organic solvent than water is 50% by mass or less, preferably 30% by mass or less, more preferably 10% by mass or less, and still more preferably 5% by mass or less in the whole of the solvent, and it is especially preferred that the reaction solvent does not substantially contain other organic solvent than water. With respect to the organic solvent as referred to herein, the tetracarboxylic acid component, such as the tetracarboxylic dianhydride, etc., the diamine component, the polyamic acid, and the imidazole are not included.

The use of such a polyamic acid aqueous solution composition having an extremely small content of the organic solvent is one of the features of the present invention.

This reaction is performed at a relatively low temperature of 100° C. or lower, and preferably 80° C. or lower for the purpose of inhibiting the imidization reaction by using the tetracarboxylic acid component (tetracarboxylic dianhydride) and the diamine component in approximately equimolar amounts. A reaction temperature is generally 25° C. to 100° C., preferably 40° C. to 80° C., and more preferably 50° C. to 80° C., and a reaction time is about 0.1 to 24 hours, and preferably about 2 to 12 hours. By allowing the reaction temperature and the reaction time to fall within the foregoing ranges, respectively, it is possible to easily obtain an aqueous solution composition containing a polyamic acid having a high molecular weight with good production efficiency. It is to be noted that though the reaction may also be performed in an air atmosphere, the reaction is performed generally in an inert gas atmosphere, and preferably in a nitrogen gas atmosphere.

As for the use of the tetracarboxylic acid component (tetracarboxylic dianhydride) and the diamine component in approximately equimolar amounts, specifically, a molar ratio [(tetracarboxylic acid component)/(diamine component)] is about 0.90 to 1.10, and preferably about 0.95 to 1.05.

The polyamic acid aqueous solution composition which is used in the present invention can be suitably used as a composition in which the concentration of a solid content derived from the polyamic acid is 5% by mass or more to 45% by mass, preferably 10% by mass or more to 40% by mass, and more preferably 15% by mass or more to 30% by mass relative to a total amount of the water and the polyamic acid. When the concentration of a solid content derived from the polyamic acid is lower than 5% by mass, there is a concern that a viscosity of the solution becomes too low, whereas when it is more than 45% by mass, there is a concern that the fluidity of the solution disappears. As for the solution viscosity, a solution viscosity at 30° C. is preferably 1,000 Pa·sec or less, more preferably 0.5 to 500 Pa·sec, still more preferably 1 to 300 Pa·sec, and especially preferably 3 to 200 Pa·sec.

When the solution viscosity is more than 1,000 Pa·sec, there is a concern that it becomes difficult to achieve mixing of the electrode active material powders or uniform application onto a collector, and when it is lower than 0.5 Pa·sec, there is a concern that dripping or the like is generated at the time of mixing the electrode active material powders or at the time of application onto a collector, whereby toughness of the polyimide resin after heat drying and imidization becomes low.

[Production of Polyimide Binder]

In general, by subjecting the aforementioned polyamic acid aqueous solution composition to a heat treatment, thereby removing water and also achieving imidization (dehydration-cyclization), it is possible to suitably obtain the polyimide binder for energy storage device.

Although the heat treatment conditions for the imidization reaction are not particularly limited, the heat treatment is performed at approximately 100° C. or higher, preferably 120° C. to 200° C., and more preferably 150° C. to 190° C. for 0.01 hours to 10 hours, and preferably 0.01 hours to 2 hours.

The polyimide binder for energy storage device of the present invention can exhibit excellent effects such that only by performing the heat treatment at a relatively low temperature (for example, 120° C. to 200° C., and preferably 150° C. to 190° C.), mechanical properties comparable to those of a polyimide obtained from a polyamic acid aqueous solution composition using a general organic solvent are revealed, and properties of the energy storage device in a wide temperature range, such as low-temperature properties and inhibition of gas generation after high-temperature storage, etc., are improved.

The polyamic acid aqueous solution composition which is used in the present invention easily becomes a polyimide resin, namely, the polyimide binder for energy storage device of the present invention, through a heat treatment or a chemical treatment with an imidizating agent or the like. A polyimide resin film is obtained by, for example, casting or applying the polyamic acid aqueous solution composition onto a base material, heat drying the resultant in the range of from 120° C. to 200° C., and then peeling away the film which has become self-supporting from the base material.

[Polyimide Binder for Energy Storage Device]

The polyimide binder for energy storage device of the present invention has a tensile elastic modulus of 1.5 GPa or more and 2.7 GPa or less, the tensile elastic modulus being obtained by a tensile test in conformity with ASTM D882. The tensile elastic modulus is preferably 1.7 GPa or more, and more preferably 1.9 GPa or more. An upper limit thereof is preferably 2.5 GPa or less, and more preferably 2.3 GPa or less.

With respect to the polyimide binder for energy storage device of the present invention, its breaking energy obtained by a tensile test in conformity with ASTM D882 is preferably 10 MJ/m$^3$ or more, and more preferably 30 MJ/m$^3$ or more. When the breaking energy falls within the foregoing range, the polyimide binder for energy storage device does not cause breakage against expansion and shrinkage accompanying charge and discharge of the electrode active material, and binding properties may be kept over a long period of time.

With respect to the polyimide binder for energy storage device of the present invention, a polyimide film fabricated by being applied onto a copper foil preferably has a peel strength (adhesiveness to copper foil), which is determined by performing a 90° peel strength test in conformity with IPC-TM650, of 0.5 N/mm or more, more preferably 0.6 N/mm or more, and especially preferably 0.7 N/mm or more.

[Embodiment 2: Electrode Sheet]

The electrode sheet of the present invention is one obtained by casting or applying an electrode mixture paste, which is obtained by mixing the polyimide binder for energy storage device of the present invention, the electrode active material selected from a negative electrode active material and a positive electrode active material, and properly an electroconductive agent, onto a collector to form an active material layer. An electrode sheet which is prepared by mixing a positive electrode active material and used as a positive electrode is called a positive electrode sheet, and an electrode sheet which is prepared by mixing a negative electrode active material and used as a negative electrode is called a negative electrode sheet.

That is, the negative electrode sheet for energy storage device of the present invention is a negative electrode sheet obtained by casting or applying a negative electrode mixture composed of the polyimide binder for energy storage device of the present invention, a silicon-containing active material, and a carbon material onto a surface of a copper collector to form a negative electrode active material layer.

The positive electrode sheet for energy storage device of the present invention is a positive electrode sheet obtained by casting or applying a positive electrode mixture composed of the polyimide binder for energy storage device of the present invention, a carbon material, and a lithium transition metal oxide onto a surface of an aluminum collector to form a positive electrode active material layer, and is a positive electrode sheet in which a proportion of a nickel atom and a manganese atom occupying in the whole of metal elements other than a lithium atom in the lithium transition metal oxide is 50 atomic % or more and 100 atomic % or less.

[Production of Electrode Sheet]

The electrode sheet can be suitably produced by mixing the negative electrode active material or positive electrode active material with the polyamic acid aqueous solution composition to prepare an electrode mixture paste, casting or applying the electrode mixture paste onto an electroconductive collector, such as an aluminum foil, a copper foil, etc., and heat treating the resultant to remove the solvent to form an active material layer on the collector and also to achieve an imidization reaction.

Specifically, the aforementioned polyamic acid aqueous solution composition is first mixed with the electrode active material preferably at a temperature ranging from 10° C. to 60° C., thereby preparing an electrode mixture paste. As the electrode active material, such as a lithium-containing metal complex oxide, a carbon powder, a silicon power, a tin powder, an alloy powder containing silicon or tin, etc., known materials may be used.

Although an amount of the electrode active material in the electrode mixture paste is not particularly limited, it is generally 0.1 to 1,000 times, preferably 1 to 1,000 times, more preferably 5 to 1,000 times, and still more preferably 10 to 1,000 times on a mass basis relative to a mass of the solid content derived from the polyamic acid. When the amount of the electrode active material is too small, there is a concern that an inactive portion increases in the active material layer formed on the collector, so that the function as an electrode becomes insufficient. When the amount of the electrode active material is too large, the active material is liable to fall off without being thoroughly bound to the collector.

It is to be noted that an additive, such as a surfactant, a viscosity modifier, an electroconductive agent, etc., may be added in the electrode mixture paste, if desired. Such an additive is preferably mixed such that the amount of the polyamic acid is 1 to 20% by mass in the whole of solids of the paste. When the amount of the additive falls outside this range, there is a concern that the performance of the electrode is worsened.

Subsequently, the electrode mixture paste obtained by using the electrode active material capable of reversibly absorbing and releasing a lithium ion by charge and discharge is cast or applied on an electroconductive collector, such as an aluminum foil, a copper foil, etc., and then heat treated at a temperature ranging preferably from 120 to 200° C., more preferably 150 to 190° C., and especially preferably from 160 to 180° C., to remove the solvent and also to achieve an imidization reaction, whereby the electrode sheet can be obtained.

In the case where the heat treatment temperature falls outside the foregoing range, there is a concern that the imidization reaction does not thoroughly proceed, or physical properties of the electrode molded article are worsened. In order to prevent foaming or powdering, the heat treatment may be performed in a multi-stage manner. A heat treatment time is preferably 0.01 to 10 hours, and more preferably 0.1 to 5 hours. When the heat treatment time is more than 10 hours, it is not preferred from the standpoint of productivity; whereas when the heat treatment time is less than 0.01 hours, there is a concern that the imidization reaction or removal of the solvent becomes insufficient, and hence, such is not preferred.

<Negative Electrode Sheet for Energy Storage Device>
[Negative Electrode Active Material]

As the negative electrode active material for energy storage device, especially lithium secondary battery, one or more selected from a lithium metal, a lithium alloy, a carbon material capable of absorbing and releasing lithium [e.g., graphitizable carbon, non-graphitizable carbon having a spacing of the (002) plane of 0.37 nm or more, graphite having a spacing of the (002) plane of 0.34 nm or less, etc.], tin (elemental substance), a tin compound, silicon (elemental substance), a silicon compound, a lithium titanate compound, such as $Li_4Ti_5O_{12}$, etc., and the like may be used solely or in combination of two or more thereof. In the present invention, it is preferred that at least tin (elemental substance), a tin compound, silicon (elemental substance), or a silicon-containing negative electrode active material, such as a silicon compound, etc., is contained as the negative electrode active material. In particular, silicon (elemental substance) or a silicon-containing negative electrode active material, such as a silicon compound, etc., has an extremely large theoretical capacity as compared with graphite, and on the other hand, a volume expansion ratio of the negative electrode active material itself on charging is extremely large.

When the polyimide binder for energy storage device of the present invention is used, since the deterioration of the negative electrode active material following the volume expansion can be conspicuously inhibited, properties of the energy storage device in a broad temperature range, such as low-temperature properties or inhibition of gas generation after high-temperature storage, etc., can be conspicuously improved.

Although the kind of the silicon-containing active material is not particularly limited, examples thereof include silicon (elemental substance), a silicon compound, a partial substitution product of silicon, a partial substitution product of a silicon compound, a solid solution of a silicon compound, and the like. As specific examples of the silicon compound, there are suitably exemplified a silicon oxide represented by the formula: $SiO_x$ (0.05<x<1.95), a silicon carbide represented by the formula: $SiC_y$ (0<y<1), a silicon nitride represented by the formula: $SiN_z$ (0<z<4/3), a silicon alloy that is an alloy of silicon and a different element M, and the like. In the silicon alloy, one or more elements selected from the group consisting of Fe, Co, Sb, Bi, Pb, Ni, Cu, Zn, Ge, In, Sn, and Ti are suitably exemplified as the different element M1.

The partial substitution product of silicon is a compound in which a part of silicon (elemental substance) or silicon contained in the silicon compound is substituted with a different element M2. As specific examples of the different element M2, for example, there are suitably exemplified B, Mg, Ni, Ti, Mo, Co, Ca, Cr, Cu, Fe, Mn, Nb, Ta, V, W, Zn, C, N, Sn, and the like. Among these silicon-containing active materials, silicon (elemental substance), a silicon oxide, and a silicon alloy are preferred, and silicon (elemental substance) and a silicon oxide are more preferred.

An amount of the silicon-containing negative electrode active material is preferably 1% by mass or more, more preferably 5% by mass or more, and still more preferably 10% by mass or more in terms of a mass of net silicon in the negative electrode mixture for the purpose of increasing the capacity, and it is preferably 95% by mass or less, more preferably 65% by mass or less, and still more preferably 45% by mass or less from the viewpoint of improving the cycle property.

Examples of the negative electrode active material for lithium primary battery include a lithium metal and a lithium alloy.

[Negative Electrode Electroconductive Agent]

Although an electroconductive agent of the negative electrode is not particularly limited so long as it is an electron-conductive material that does not undergo a chemical change, it is preferred to use a metal powder, such as copper, nickel, titanium, aluminum, etc., a carbon material, or the like. As the carbon material which is used as the electroconductive agent or the negative electrode active material, there are suitably exemplified graphites, such as natural graphite (e.g., flaky graphite, etc.), artificial graphite, etc.; one or more carbon blacks selected from acetylene black, Ketjen black, channel black, furnace black, lamp black, and thermal black; and fibrous carbon powders, such as carbon nanotubes, carbon fibers, etc.

As the negative electrode electroconductive agent, it is more preferred that graphite and carbon black, graphite and a fibrous carbon powder, carbon black and a fibrous carbon powder, and the like, each are properly mixed and used in combination. In particular, the use of the fibrous carbon powder is preferred because the electroconductivity is ensured, so that an effect for decreasing the use amount of an electroconductive agent having a large specific surface area is brought.

Although the carbon material is used as the electroconductive agent or the negative electrode active material, an addition amount of the carbon material to the negative electrode mixture is preferably 1 to 90% by mass, and more preferably 10 to 70% by mass.

In the case of using a mixture of the silicon-containing negative electrode active material and the carbon material as the negative electrode electroconductive agent, with respect to a ratio of the silicon-containing negative electrode active material and the carbon material, the amount of the carbon material is preferably 10% by mass or more, and more preferably 20% by mass or more relative to the whole mass of net silicon of the silicon-containing negative electrode active material in the negative electrode mixture from the viewpoint of a cycle improvement based on the effect for improving electron conductivity due to mixing with the carbon material. When the ratio of the carbon material to be mixed with the silicon-containing negative electrode active material is too large, there is a concern that the amount of the silicon-containing negative electrode active material in the negative electrode mixture layer is decreased, so that the effect for increasing the capacity becomes small. Therefore, the mass of net silicon of the silicon-containing negative electrode active material is preferably 1% by mass or more, more preferably 2% by mass or more, and still more preferably 5% by mass or more relative to a total mass of the carbon material.

The aforementioned electroconductive agent is more preferably a complex obtained by mixing the carbon material with the silicon-containing active material in advance and properly heat treating the mixture.

In the case of using graphite, it is more preferred to use a carbon material having a graphite-type crystal structure in which a lattice (002) spacing ($d_{002}$) of graphite is 0.340 nm (nanometers) or less, especially 0.335 to 0.337 nm.

In particular, it is preferred to use an artificial graphite particle having a bulky structure in which plural flat graphite fine particles are mutually gathered or bound in non-parallel, or a graphite particle prepared by subjecting a flaky natural graphite particle to a spheroidizing treatment by repeatedly giving a mechanical action, such as compression force, frictional force, shear force, etc.

When a ratio [I(110)/I(004)] of a peak intensity I(110) of the (110) plane to a peak intensity I(004) of the (004) plane of the graphite crystal, each intensity being obtained from the X-ray diffraction measurement of a negative electrode sheet at the time of shaping under pressure such that the density of a portion of the negative electrode except for the collector is 1.5 g/cm$^3$ or more, is 0.01 or more, the electrochemical characteristics in a much broader temperature range are improved, and hence, such is preferred. The peak intensity ratio [I(110)/I(004)] is more preferably 0.05 or more, and still more preferably 0.1 or more. When excessively treated, there is a concern that the crystallinity is worsened, and the discharge capacity of the battery is worsened, and therefore, an upper limit of the peak intensity ratio [I(110)/I(004)] is preferably 0.5 or less, and more preferably 0.3 or less.

When the high-crystalline carbon material (core material) is coated with a carbon material that is more low-crystalline than the core material, the electrochemical characteristics in a broad temperature range become much more favorable, and hence, such is preferred. The crystallinity of the carbon material of the coating may be confirmed by TEM.

When the high-crystalline carbon material is used, there is a tendency that it reacts with the nonaqueous electrolytic solution on charging, which causes an increase of the interfacial resistance, thereby worsening the properties of the energy storage device in a broad temperature range, such as low-temperature properties or inhibition of gas generation after high-temperature storage, etc.; however, in the case of using the polyimide binder for energy storage device of the present invention, the properties of such an energy storage device become favorable.

[Negative Electrode Binder]

The polyimide binder for energy storage device of the present invention is used as a binder for negative electrode.

It is more preferred to use the polyimide binder in combination with other binder which is soluble or dispersible in a colloidal state in water. Specifically, it is preferred to use the polyimide binder in combination with one or more binders selected from polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and an ethylene-propylene-diene terpolymer. Of those, it is more preferred to use the polyimide binder in combination with one or more binders selected from SBR and CMC.

In the case of using the polyimide binder for energy storage device of the present invention in combination with other binder, a proportion of the mass of the other binder is preferably 1 to 95% by mass, and more preferably 5 to 45% by mass relative to a total mass of the binder.

<Positive Electrode Sheet for Energy Storage Device>

[Positive Electrode Active Material]

As the positive electrode active material for energy storage device, especially lithium secondary battery, usable is a complex metal oxide of lithium and one or more selected from cobalt, manganese, and nickel. These positive electrode active materials may be used solely or in combination of two or more thereof.

As such a lithium complex metal oxide, for example, one or more selected from $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, and $LiCo_{0.98}Mg_{0.02}O_2$ are exemplified. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle property, and for enabling the use at a charge potential of 4.3 V or more, a part of the lithium complex metal oxide may be substituted with other elements. For example, a part of cobalt, manganese, or nickel may be substituted with at least one or more elements of Sn, Mg, Fe, Ti, Al, Zr, Cr, V, Ga, Zn, Cu, Bi, Mo, La, etc.; or a part of O may be substituted with S or F; or the oxide may be coated with a compound containing any of such other elements.

Of those, preferred are lithium complex metal oxides, such as $LiCoO_2$, $LiMn_2O_4$, and $LiNiO_2$, with which the charge potential of the positive electrode in a fully-charged state may be used at 4.3 V or more based on Li; and more preferred are lithium complex metal oxides in which a proportion of a nickel atom and a manganese atom occupying in the whole of metal elements other than a lithium atom in the lithium complex metal oxide is 50 atomic % or more and 100 atomic % or less, such as a different kind element substituent lithium cobalt oxide, e.g., $LiCo_{1-x}M_xO_2$ (wherein M is one or more elements selected from Sn, Mg, Fe, Ti, Al, Zr, Cr, V, Ga, Zn, and Cu; and $0.001 \leq x \leq 0.05$), etc., $LiNi_{1/3}Mn_{1/3}Co_{1/3}O_2$, $LiNi_{0.5}Mn_{0.3}Co_{0.2}O_2$, $LiNi_{1/2}Mn_{3/2}O_4$, and a solid solution of $Li_2MnO_3$ and $LiMO_2$ (wherein M is a transition metal, such as Co, Ni, Mn, Fe, etc.), and the like that may be used at 4.4 V or more. When the lithium complex metal oxide capable of acting at a high charge voltage is used, in the case of using in a broad temperature range, the properties of the energy storage device are liable to be worsened due to the reaction with the electrolytic solution on charging. However, when the polyimide binder for energy storage device of the present invention is used, worsening of the properties of such an energy storage device can be inhibited.

Furthermore, a lithium-containing olivine-type phosphate may also be used as the positive electrode active material. Especially preferred are lithium-containing olivine-type phosphates containing one or more selected from iron, cobalt, nickel, and manganese. Specific examples thereof include one or more selected from $LiFePO_4$, $LiCoPO_4$, $LiNiPO_4$, and $LiMnPO_4$.

These lithium-containing olivine-type phosphates may be partly substituted with any other element; and for example, a part of iron, cobalt, nickel, or manganese therein may be substituted with one or more elements selected from Co, Mn, Ni, Mg, Al, B, Ti, V, Nb, Cu, Zn, Mo, Ca, Sr, W, Zr, and the like; or the phosphates may also be coated with a compound containing any of these other elements or with a carbon material. Of those, $LiFePO_4$ and $LiMnPO_4$ are preferred.

The lithium-containing olivine-type phosphate may be used, for example, in combination with the aforementioned positive electrode active material.

For the positive electrode for lithium primary battery, there are suitably exemplified oxides or chalcogen compounds of one or more metal elements, such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, etc.; sulfur compounds, such as $SO_2$, $SOCl_2$, etc.; and carbon fluorides (graphite fluoride) represented by the general formula: $(CF_x)_n$. Above all, $MnO_2$, $V_2O_5$, graphite fluoride, and the like are preferred.

[Positive Electrode Electroconductive Agent]

An electroconductive agent of the positive electrode is not particularly limited so long as it is an electron-conductive material that does not undergo a chemical change. Examples thereof include graphites, such as natural graphite (e.g., flaky graphite, etc.), artificial graphite, etc.; one or more carbon blacks selected from acetylene black, Ketjen black, channel black, furnace black, lamp black, and thermal black; and fibrous carbon powders, such as carbon nanotubes, carbon fibers, etc. It is more preferred that graphite and carbon black, graphite and a fibrous carbon powder, carbon black and a fibrous carbon powder, and the like, each are properly mixed and used in combination. An addition amount of the electroconductive agent to the positive electrode mixture is preferably from 1 to 10% by mass, and especially preferably from 2 to 5% by mass.

[Positive Electrode Binder]

Although the polyimide binder for energy storage device of the present invention is used as the binder for positive electrode, polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), or an ethylene-propylene-diene terpolymer may also be used as other binder.

The polyimide binder for energy storage device of the present invention may also be used in combination with other binder. On that occasion, a preferred embodiment is the same as the embodiment described in the section of [Negative Electrode Binder]

[Embodiment 3: Energy Storage Device]

The energy storage device as referred to in the present invention includes energy storage devices, such as a lithium battery, an electric double layer capacity, a lithium ion capacitor, etc. Of those, a lithium battery using a lithium salt for the electrolyte salt is preferred, and a lithium secondary battery is the most suitable.

<First Energy Storage Device (Lithium Battery)>

The lithium battery as referred to in the present specification is a generic name for a lithium primary battery and a lithium secondary battery. In the present specification, the term, lithium secondary battery, is used as a concept also including a so-called lithium ion secondary battery. The lithium battery of the present invention is composed of a positive electrode, a negative electrode, and the aforementioned nonaqueous electrolytic solution having an electrolyte salt dissolved in a nonaqueous solvent. As the positive electrode and the negative electrode, the electrode sheets described in the foregoing Embodiment 2 are used.

[Nonaqueous Electrolytic Solution]

In the lithium battery of the present invention, by combining the electrode sheets of Embodiment 2 with a nonaqueous electrolytic solution in which an electrolyte salt is dissolved in a nonaqueous solvent as described below, a peculiar effect for enabling properties of the energy storage device in a broad temperature range, such as low-temperature properties or inhibition of gas generation after high-temperature storage, etc., to be improved is revealed.

[Nonaqueous Solvent]

Examples of the nonaqueous solvent which is used for the nonaqueous electrolytic solution of the lithium battery of the present invention include one or more selected from a cyclic carbonate, a linear ester, a lactone, an ether, and an amide. From the viewpoint of synergistically improving the electrochemical characteristics in a broad temperature range, as for the nonaqueous solvent, it is preferred to contain a linear ester, it is more preferred to contain a linear carbonate, and it is the most preferred to contain both a cyclic carbonate and a linear carbonate.

The term "linear ester" as referred to herein is used as a concept including a linear carbonate and a linear carboxylic acid ester.

As the cyclic carbonate, one or more selected from ethylene carbonate (EC), propylene carbonate (PC), 1,2-butylene carbonate, and 2,3-butylene carbonate are more suitable.

When the nonaqueous solvent contains ethylene carbonate and/or propylene carbonate, resistance of a surface film formed on an electrode becomes small, and hence, such is preferred. A content of ethylene carbonate and/or propylene carbonate is preferably 3% by volume or more, more preferably 5% by volume or more, and still more preferably 7% by volume or more relative to a total volume of the nonaqueous solvent, and an upper limit thereof is preferably 45% by volume or less, more preferably 35% by volume or less, and still more preferably 25% by volume or less.

As the linear ester, there are suitably exemplified one or more asymmetric linear carbonates selected from methyl ethyl carbonate (MEC), methyl propyl carbonate (MPC), methyl isopropyl carbonate (MIPC), methyl butyl carbonate, and ethyl propyl carbonate; one or more symmetric linear carbonates selected from dimethyl carbonate (DMC), diethyl carbonate (DEC), dipropyl carbonate, and dibutyl carbonate; and one or more linear carboxylic acid esters selected from pivalic acid esters, such as methyl pivalate, ethyl pivalate, propyl pivalate, etc., methyl propionate, ethyl propionate, methyl acetate, and ethyl acetate.

Among the aforementioned linear esters, linear esters having an ethyl group, which are selected from methyl ethyl carbonate, diethyl carbonate, ethyl propionate, and ethyl acetate, are preferred, and linear carbonates having an ethyl group are especially preferred.

In the case of using a linear carbonate, it is preferred to use two or more kinds thereof. Furthermore, it is more preferred that both a symmetric linear carbonate and an asymmetric linear carbonate are contained, and it is still more preferred that a content of the symmetric linear carbonate is more than that of the asymmetric linear carbonate.

Although a content of the linear ester is not particularly limited, it is preferred to use the linear ester in an amount in the range of from 60 to 90% by volume relative to a total volume of the nonaqueous solvent. When the content is 60% by volume or more, the viscosity of the nonaqueous electrolytic solution does not become excessively high, whereas it is 90% by volume or less, there is less concern that an electroconductivity of the nonaqueous electrolytic solution decreases, thereby worsening the electrochemical characteristics in a broad temperature range, and therefore, it is preferred that the content of the linear ester falls within the foregoing range.

A proportion of the volume of the symmetric linear carbonate occupying in the linear carbonate is preferably 51% by volume or more, and more preferably 55% by volume or more. An upper limit thereof is more preferably 95% by volume or less, and still more preferably 85% by volume or less. It is especially preferred that dimethyl carbonate is contained as the symmetric linear carbonate. It is more preferred that the asymmetric linear carbonate has a methyl group, and methyl ethyl carbonate is especially preferred.

The aforementioned case is preferred because the electrochemical characteristics in a much broader temperature range are improved.

As for a proportion of the cyclic carbonate and the linear ester, from the viewpoint of improving the electrochemical characteristics in a broad temperature range, a ratio of the cyclic carbonate to the linear ester (volume ratio) is preferably 10/90 to 45/55, more preferably 15/85 to 40/60, and especially preferably 20/80 to 35/65.

When a fluorine-containing compound is contained in the nonaqueous electrolytic solution, the high-temperature cycle property of the energy storage device using an electrode formed by using the polyimide binder for energy storage device of the present invention can be much more increased, and hence, such is preferred. It may be considered that the fluorine-containing compound acts on the carboxylic acid which has remained very slightly without being imidized, thereby preventing the matter that the remaining carboxylic acid electrochemically reacts with the nonaqueous electrolytic solution to cause worsening of the properties of the energy storage device from occurring imidization.

As specific examples of the fluorine-containing compound, preferred are at least one fluorine-containing cyclic carbonate selected from 4-fluoro-1,3-dioxolan-2-one (FEC), trans- or cis-4,5-difluoro-1,3-dioxolan-2-one (the both will be hereunder named generically as "DFEC"), and 4-(trifluoromethyl)-1,3-dioxolan-2-one; at least one fluorine-containing linear carbonate selected from fluoromethyl methyl carbonate, bis(fluoromethyl) carbonate, difluoromethyl methyl carbonate, 2-fluoroethyl methyl carbonate, difluoromethyl fluoromethyl carbonate, 2,2-difluoroethyl methyl carbonate, bis(2-fluoroethyl) carbonate (DFDEC), ethyl-(2,2-difluoroethyl) carbonate, bis(2,2-difluoroethyl) carbonate, 2,2,2-trifluoroethyl methyl carbonate, ethyl-(2,2,2-trifluoroethyl) carbonate, and bis(2,2,2-trifluoroethyl) carbonate; one or more fluorine-containing ethers selected from $HCF_2CF_2CH_2OCF_2CF_2H$, $CF_3CF_2CH_2OCF_2CF_2H$, $HCF_2CF_2CH_2OCF_2CFHCF_3$, and $CF_3CF_2CH_2OCF_2CFHCF_3$; and a fluorine-containing S=O compound selected from methanesulfonyl fluoride and vinyl sulfonyl fluoride (VFS).

Of those, one or more selected from 4-fluoro-1,3-dioxolan-2-one, trans- or cis-4,5-difluoro-1,3-dioxolan-2-one, difluoromethyl fluoromethyl carbonate, 2-fluoroethyl methyl carbonate, bis(2-fluoroethyl) carbonate, bis(2,2,2-trifluoroethyl) carbonate, $HCF_2CF_2CH_2OCF_2CF_2H$, and vinyl sulfonyl fluoride are preferred; and one or more selected from 4-fluoro-1,3-dioxolan-2-one, trans- or cis-4,5-difluoro-1,3-dioxolan-2-one, and vinyl sulfonyl fluoride are especially preferred.

A content of the fluorine-containing compound is preferably 0.07% by volume or more, more preferably 4% by volume or more, and still more preferably 7% by volume or more relative to a total volume of the nonaqueous solvent, and when an upper limit thereof is preferably 35% by volume or less, more preferably 25% by volume or less, and still more preferably 15% by volume or less, stability of a surface film at the time of high-temperature storage can be much more increased without impairing Li ion permeability at low temperatures, and hence, such is preferred.

As other nonaqueous solvents, there are suitably exemplified one or more selected from cyclic ethers, such as tetrahydrofuran, 2-methyltetrahydrofuran, 1,4-dioxane, etc.; linear ethers, such as 1,2-dimethoxyethane, 1,2-diethoxyethane, 1,2-dibutoxyethane, etc.; amides, such as dimethylformamide, etc.; sulfones, such as sulfolane, etc.; and lactones, such as γ-butyrolactone, γ-valerolactone, α-angelicalactone, etc.

As for the aforementioned nonaqueous solvent, in order to achieve appropriate physical properties, a mixture thereof is generally used. As a combination thereof, for example, there are suitably exemplified a combination of a cyclic carbonate and a linear carbonate, a combination of a cyclic carbonate and a linear carboxylic acid ester, a combination of a cyclic carbonate, a linear carbonate, and a lactone, a combination of a cyclic carbonate, a linear carbonate, and an ether, a combination of a cyclic carbonate, a linear carbonate, and a linear carboxylic acid ester, and the like.

[Additive]

For the purpose of improving the properties of the energy storage device in a much broader temperature range, it is preferred to further add an additive in the nonaqueous electrolytic solution. As specific examples of other additive, there are suitably exemplified (a) an unsaturated bond-containing cyclic carbonate, (b) an isocyanate compound, (c) a phenyl carbonate compound, and (d) a cyclic acetal compound. It may be considered that such an additive acts on the carboxylic acid which has remained very slightly without being imidized, thereby preventing the matter that the remaining carboxylic acid electrochemically reacts with the nonaqueous electrolytic solution to cause worsening of the properties of the energy storage device from occurring.

(a) Unsaturated Bond-Containing Cyclic Carbonate

Examples of the unsaturated bond-containing cyclic carbonate include one or more carbon-carbon double bond- or carbon-carbon triple bond-containing cyclic carbonates selected from vinylene carbonate (VC), vinyl ethylene carbonate (VEC), 4-ethynyl-1,3-dioxolan-2-one (EEC), ethylene carbonate, propylene carbonate, 4-fluoro-1,3-dioxolan-2-one, and 4-ethynyl-1,3-dioxolan-2-one (EEC), and the like. Of those, VC, VEC, and EEC are preferred, and VC and EEC are more preferred.

(b) Isocyanate Compound

Examples of the isocyanate compound include one or more isocyanate compounds selected from methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, 2-isocyanatoethyl methacrylate, and the like. Of those, one or more selected from hexamethylene diisocyanate, octamethylene diisocyanate, 2-isocyanatoethyl acrylate, and 2-isocyanatoethyl methacrylate are preferred.

(c) Phenyl Carbonate Compound

Examples of the phenyl carbonate compound include methyl phenyl carbonate, ethyl phenyl carbonate, diphenyl carbonate, and the like. Of those, methyl phenyl carbonate and diphenyl carbonate are preferred.

(d) Cyclic Acetal Compound

Examples of the cyclic acetal compound include 1,3-dioxolane, 1,3-dioxane, 1,3,5-trioxane, and the like. Of those, 1,3-dioxolane and 1,3-dioxane are preferred, and 1,3-dioxolane is more preferred.

A content of each of the aforementioned (a) to (d) compounds is preferably 0.001 to 5% by mass in the nonaqueous electrolytic solution. In this range, a surface film is thoroughly formed without becoming excessively thick, and the effect for improving properties of the energy storage device in a broad temperature range increases. The content is more preferably 0.01% by mass or more, and still more preferably 0.1% by mass or more in the nonaqueous electrolytic solution. Its upper limit is more preferably 3% by mass or less, and still more preferably 2% by mass or less.

[Electrolyte Salt]

As the electrolyte salt which is used for the nonaqueous electrolytic solution of the lithium battery of the present invention, there are suitably exemplified the following lithium salts.

[Li Salt—Class 1]

One or more "complex salts of a Lewis acid and LiF" selected from $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso\text{-}C_3F_7)_3$, and $LiPF_5(iso\text{-}C_3F_7)$ are suitably exemplified. Of those, $LiPF_6$, $LiBF_4$, and $LiAsF_6$ are preferred; and $LiPF_6$ and $LiBF_4$ are more preferred.

[Li Salt—Class 2]

One or more "imide or methide lithium salts" selected from $LiN(SO_2F)_2$, $LiN(SO_2CF_3)_2$, $LiN(SO_2C_2F_5)_2$, $(CF_2)_2(SO_2)_2NLi$ (cyclic), $(CF_2)_3(SO_2)_2NLi$ (cyclic), and $LiC(SO_2CF_3)_3$ are suitably exemplified. Of those, $LiN(SO_2F)_2$ (LiFSI), $LiN(SO_2CF_3)_2$, and $LiN(SO_2C_2F_5)_2$ are preferred; and $LiN(SO_2F)_2$ and $LiN(SO_2CF_3)_2$ are more preferred.

[Li Salt—Class 3]

One or more "$S(=O)_2O$ structure-containing lithium salts" selected from $LiSO_3F$, $LiCF_3SO_3$, $CH_3SO_4Li$, $C_2H_5SO_4Li$, $CF_3CH_2SO_4Li$, and $C_3H_7SO_4Li$ are suitably exemplified. Of those, $LiSO_3F$, $CH_3SO_4Li$, $C_2H_5SO_4Li$, and $CF_3CH_2SO_4Li$ are more preferred.

[Li Salt—Class 4]

One or more "P=O or Cl=O structure-containing lithium salts" selected from $LiPO_2F_2$, $Li_2PO_3F$, and $LiClO_4$ are suitably exemplified. Of those, $LiPO_2F_2$ and $Li_2PO_3F$ are preferred.

[Li Salt—Class 5]

One or more "lithium salts containing an oxalate complex as an anion" selected from lithium bis[oxalate-O,O']borate (LiBOB), lithium difluoro[oxalate-O,O']borate, lithium difluorobis[oxalate-O,O']phosphate (LiPFO), and lithium tetrafluoro[oxalate-O,O']phosphate are suitably exemplified. Of those, LiBOB and LiPFO are more preferred.

The lithium salts may be used solely or in admixture of two or more thereof.

Of those, one or more selected from $LiPF_6$, $LiPO_2F_2$, $Li_2PO_{3F}$, $LiBF_4$, $LiSO_3F$, $CH_3SO_4Li$, $C_2H_5SO_4Li$, $CF_3CH_2SO_4Li$, $LiN(SO_2F)_2$, $LiN(SO_2CF_3)_2$, $LiN(SO_2C_2F_5)_2$, lithium bis[oxalate-O,O']borate, lithium difluorobis[oxalate-O,O']phosphate, and lithium tetrafluoro[oxalate-O,O']phosphate are preferred, one or more selected from $LiPF_6$, $LiPO_2F_2$, $LiSO_3F$, $C_2H_5SO_4Li$, $CF_3CH_2SO_4Li$, $LiN(SO_2F)_2$, lithium bis[oxalate-O,O']borate, and lithium difluorobis[oxalate-O,O']phosphate are more preferred, and $LiPF_6$ is especially preferred.

In general, a concentration of the lithium salt is preferably 0.3 M or more, more preferably 0.7 M or more, and still more preferably 1.1 M or more relative to the nonaqueous solvent. Its upper limit is preferably 2.5 M or less, more preferably 2.0 M or less, and still more preferably 1.6 M or less.

As a suitable combination of these lithium salts, a combination including $LiPF_6$ and one or more selected from $LiPO_2F_2$, $LiSO_3F$, $C_2H_5SO_4Li$, $CF_3CH_2SO_4Li$, $LiN(SO_2F)_2$, lithium bis[oxalate-O,O']borate, lithium difluoro[oxalate-O,O']borate, lithium difluorobis[oxalate-O,O']phosphate, and lithium tetrafluoro[oxalate-O,O']phosphate is preferred; and a combination including $LiPF_6$ and one or more selected from $LiPO_2F_2$, $LiSO_3F$, $C_2H_5SO_4Li$, $LiN(SO_2F)_2$, lithium difluoro[oxalate-O,O']borate, lithium difluorobis[oxalate-O,O']phosphate, and lithium tetrafluoro[oxalate-O,O']phosphate is more preferred.

When a proportion of the lithium salt other than $LiPF_6$ occupying in the nonaqueous solvent is 0.001 M or more, the effect for improving electrochemical characteristics at high temperatures is liable to be exhibited, whereas when it is 0.005 M or less, there is less concern that the effect for improving electrochemical characteristics at high temperatures is worsened, and hence, such is preferred. The proportion of the lithium salt other than $LiPF_6$ is preferably 0.01 M or more, especially preferably 0.03 M or more, and most preferably 0.04 M or more. Its upper limit is preferably 0.4 M or less, and especially preferably 0.2 M or less.

[Production of Nonaqueous Electrolytic Solution]

The nonaqueous electrolytic solution which is used for the energy storage device of the present invention may be, for example, obtained by mixing the aforementioned nonaqueous solvent and adding an additive to the aforementioned electrolyte salt and the nonaqueous electrolytic solution.

At this time, the nonaqueous solvent to be used and the compounds to be added to the nonaqueous electrolytic solution are preferably purified in advance to reduce as much as possible the content of impurities, in such an extent that the productivity is not conspicuously worsened.

The nonaqueous electrolytic solution of the present invention may be used not only in the form of a liquid but also in the form of a gel. Furthermore, the nonaqueous electrolytic solution of the present invention may also be used for a solid polymer electrolyte.

[Lithium Battery]

The structure of the lithium battery of the present invention is not particularly limited, and may be a coin-type battery, a cylinder-type battery, a prismatic battery, a laminate-type battery, or the like, each having a single-layered or multi-layered separator. Although the separator for the battery is not particularly limited, a single-layered or laminated micro-porous film of a polyolefin, such as polypropylene, polyethylene, etc., as well as a woven fabric, a nonwoven fabric, etc., may be used.

The lithium battery of the present invention has excellent electrochemical characteristics in a broad temperature range even when the final charging voltage is 4.2 V or more, and particularly 4.3 V or more, and furthermore, the characteristics thereof are still good even at 4.4 V or more. Although the final discharging voltage may be generally 2.8 V or more, and further 2.5 V or more, the final discharging voltage of the lithium secondary battery of the present invention may be 2.0 V or more. Although a current value is not particularly limited, in general, the battery is used within the range of from 0.1 to 30 C. The lithium battery of the present invention may be charged/discharged at −40 to 100° C., and preferably at −10 to 80° C.

In the lithium battery of the present invention, as a countermeasure against an increase in the internal pressure of the lithium battery, such a method may be adopted that a safety valve is provided in the battery cap, and a cutout is provided in the battery component, such as a battery can, a gasket, etc. As a safety countermeasure for preventing overcharging, a current cut-off mechanism capable of detecting an internal pressure of the battery to cut off the current may be provided in a battery cap.

<Second Energy Storage Device (Electric Double Layer Capacitor)>

The second energy storage device of the present invention is an energy storage device including the nonaqueous electrolytic solution of the present invention and storing energy by utilizing the electric double layer capacitance in the interface between the electrolytic solution and the electrode. One example of the present invention is an electric double layer capacitor. The most typical electrode active material to be used in this energy storage device is active carbon. The double layer capacitance increases almost in proportion to the surface area.

<Third Energy Storage Device>

The third energy storage device of the present invention is an energy storage device including the nonaqueous electrolytic solution of the present invention and storing energy by utilizing the doping/dedoping reaction of the electrode therein. As the electrode active material for use in this energy storage device, there are exemplified metal oxides, such as ruthenium oxide, iridium oxide, tungsten oxide, molybdenum oxide, copper oxide, etc.; and t-conjugated polymers, such as polyacene, polythiophene derivatives, etc. The capacitor that uses such an electrode active material enables energy storage along with the doping/dedoping reaction at the electrode therein.

<Fourth Energy Storage Device (Lithium Ion Capacitor)>

The fourth energy storage device of the present invention is an energy storage device including the nonaqueous electrolytic solution of the present invention and storing energy by utilizing intercalation of a lithium ion into a carbon material, such as graphite, etc., servicing as the negative electrode. This energy storage device is called a lithium ion capacitor (LIC). As the positive electrode, there are suitably exemplified one utilizing an electric double layer between an active carbon electrode and an electrolytic solution therein, one utilizing doping/dedoping reaction of a π-conjugated polymer electrode, and the like. The electrolytic solution contains at least a lithium salt, such as $LiPF_6$, etc.

EXAMPLES

The present invention is hereunder specifically described by reference to Examples and Comparative Examples, but it should not be construed that the present invention is limited to these Examples.

[Production of Polyamic Acid Aqueous Solution Composition for Energy Storage Device]

In a glass-made reactor having an internal volume of 500 mL and equipped with a stirrer, and nitrogen gas inlet and outlet tubes, 425 g of water as a solvent was added, 20.44 g (0.176 moles) of 1,6-hexamethylenediamine and 42.28 g (1.25 times equivalents to the carboxyl group) of 1,2-dimethylimidazole were then added thereto, and the contents were stirred and dissolved at 25° C. for 1 hour. To this solution, 54.56 g (0.176 moles) of 4,4'-oxydiphthalic dianhydride was added, and the contents were stirred at 70° C. for 6 hours, thereby obtaining polyamic acid aqueous solution compositions for energy storage device of binders Nos. A-1 to A-4 as described in Table 1, each having a solid content concentration of 12.4% by mass, a solution viscosity of 0.5 Pa-sec, and a logarithmic viscosity of 0.49.

With respect to binders Nos. C-1 and C-2, polyamic acid aqueous solution compositions for energy storage device were obtained under conditions as described in Table 1.

With respect to binders Nos. C-3 to C-4, polyamic acid aqueous solution compositions for energy storage device were obtained in the same manner as that as described above, except for using 1-methyl-2-pyrrolidone (NMP) as the solvent and not using the 1,2-dimethylimidazole. A binder No. C-5 was produced by using a 1-methyl-2-pyrrolidone solution of polyvinylidene fluoride (PVdF).

[Mechanical Properties of Binder for Energy Storage Device]

By using each of the above-obtained polyamic acid aqueous solution compositions for energy storage device, a polymer was produced under heat-curing conditions as described in Table 1 and measured for tensile elastic modulus, breaking energy, and adhesiveness to copper foil. The results are shown in Table 1. The measurement methods of the mechanical properties are shown below.

<Mechanical Properties (Tensile Test)>

The polyamic acid aqueous solution composition for energy storage device was applied on a glass plate as a base material by using a bar coater; and after subjecting the surface film to defoaming and preliminary drying under reduced pressure at 25° C. for 30 minutes, the resultant was charged in a hot air dryer at atmospheric pressure and heat treated at 80° C. for 30 minutes, at 120° C. for 30 minutes, and at a maximum temperature (150° C. to 200° C.) for a prescribed time (0.5 to 1 hour), thereby producing a polyimide film having a thickness of 25

The polyimide film produced by the aforementioned method was subjected to a tensile test using a tensile tester (RTC-1225A, manufactured by Orientec Co., Ltd.) in conformity with ASTM D882, thereby determining tensile elastic modulus (GPa) and breaking energy ($MJ/m^3$).

<Adhesiveness to Copper Foil (90° Peel Strength Test)>

The polyamic acid aqueous solution composition for energy storage device was applied on a copper foil as a base material by using a bar coater; and after subjecting the surface film to defoaming and preliminary drying under reduced pressure at 25° C. for 30 minutes, the resultant was charged in a hot air dryer at atmospheric pressure and heat treated at 80° C. for 30 minutes, at 120° C. for 30 minutes, and at a maximum temperature (150° C. to 200° C.) for a prescribed time (0.5 to 1 hour), thereby producing a polyimide film having a thickness of 25 μm.

The polyimide film produced by the aforementioned method was subjected to a 90° peel strength (N/mm) test using a universal tester (RTC-1225A, manufactured by Orientec Co., Ltd.) in conformity with IPC-TM650, thereby evaluating adhesiveness to copper foil.

TABLE 1

| Binder No. | Structure of polyamic acid (general formula (I)) A in the formula (I) (mol %) | Structure of polyamic acid (general formula (I)) B in the formula (I) (mol %) | Solvent | Heat curing conditions Maximum temperature (° C.) | Heat curing conditions Holding time at maximum temperature (hr) | Physical properties of polyimide binder Tensile elastic modulus (GPa) | Physical properties of polyimide binder Breaking energy (MJ/m$^3$) | Physical properties of polyimide binder Adhesiveness to copper foil (N/mm) |
|---|---|---|---|---|---|---|---|---|
| A-1 | [diphenyl ether structure] 100 | $-(CH_2)_6-$ 100 | Water | 200 | 1 | 2.2 | 60 | 1.05 |
| A-2 | " | " | | 170 | 1 | 2.1 | 48 | 0.78 |
| A-3 | " | " | | 150 | 1 | 2.0 | 17 | 0.65 |
| A-4 | " | " | | 170 | 0.5 | 2.1 | 46 | 0.75 |
| C-1 | [biphenyl structure] 70 / [diphenyl ether structure] 30 | [diphenyl ether-diyl] 70 / [p-phenylene] 30 | | 200 | 1 | 4.0 | 75 | 1.10 |
| C-2 | [biphenyl structure] 50 / [diphenyl ether structure] 50 | [diphenyl ether-diyl] 60 / [p-phenylene] 20 / $-(CH_2)_6-$ 20 | | 200 | 1 | 3.1 | 100 | 1.35 |
| C-3 | [tetramethylbenzene structure] 100 | [diphenyl ether-diyl] 100 | NMP | 200 | 1 | 2.8 | 28 | 0.49 |
| C-4 | [biphenyl structure] 100 | [diphenyl ether-diyl] 100 | | 200 | 1 | 3.2 | 86 | 0.50 |
| C-5 | Polyvinylidene fluoride (PVdF) | | | | | 1.5 | 4 | 0.15 |

[Production of Electrode Sheet and Lithium Secondary Battery, and Evaluation of Battery Characteristics]

Examples of an electrode sheet using the polyimide binder for energy storage device and a lithium secondary battery using the same are hereunder described, but it should not be construed that the present invention is limited to these Examples.

Examples 1 to 8 and Comparative Examples 1 to 6

Production of Lithium Ion Secondary Battery

93% by mass of $LiNi_{0.5}Mn_{0.3}Co_{0.2}O_2$ and 3% by mass of acetylene black (electroconductive agent) were mixed and then added to and mixed with a solution which had been prepared by dissolving 4% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by cutting into a predetermined size, thereby producing a positive electrode sheet of a positive electrode No. 1.

The polyimide binder for energy storage device as described in Table 1, a silicon elemental substance (Si), silicon oxide (SiO), artificial graphite ($d_{002}$=0.335 nm), acetylene black, and a fibrous carbon powder (diameter: 12 nm, fiber length: 114 nm) were used, and a negative electrode mixture paste having a composition as described in Table 2 was prepared. The negative electrode mixture paste was applied onto one surface of a copper foil (collector), heated and dried under heat curing conditions as described in Table 1, and then treated under pressure, followed by cutting into a predetermined size, thereby producing a negative electrode sheet. Then, the positive electrode sheet, a micro-porous polyethylene film-made separator, and the negative electrode sheet were laminated in this order, and a nonaqueous electrolytic solution having a composition as described as Example 2 in Table 3 was added, thereby producing 2032 coin-type batteries of Examples 1 to 8 and Comparative Examples 1 to 6. In Example 8, a negative electrode sheet was produced in the same manner as that in Example 2, except for mixing A-2 and SBR as the binder to produce a negative electrode mixture paste.

[Evaluation of Low-Temperature Properties after High-Temperature Charging Storage]

<Initial Discharge Capacity>

In a thermostatic chamber at 25° C., each of the coin-type batteries produced by the aforementioned method was charged up to a final voltage of 4.2 V with a constant current of 1 C and under a constant voltage for 3 hours, and the battery was discharged down to a final voltage of 2.75 V with a constant current of 1 C. This cycle was repeated 10 times, and then, the battery was once again charged up to a final voltage of 4.2 V for 3 hours, the temperature of the thermostatic chamber was then decreased to 0° C., and the battery was discharged down to a final voltage of 2.75 V with a constant current of 1 C, thereby determining an initial discharge capacity at 0° C.

<High-Temperature Charging Storage Test>

Subsequently, in a thermostatic chamber at 85° C., this coin-type battery was charged up to a final voltage of 4.2 V with a constant current of 1 C and under a constant voltage for 3 hours and then stored for 3 days in a state of keeping at 4.2 V. Thereafter, the resultant was put in a thermostatic chamber at 25° C. and then once discharged down to a final voltage of 2.75 V with a constant current of 1 C.

<Discharge Capacity after High-Temperature Charging Storage>

Furthermore, a discharge capacity at 0° C. after the high-temperature charging storage was then determined in the same manner as the measurement of the initial discharge capacity.

<Discharge Capacity Retention Rate at 0° C. after High-Temperature Charging Storage>

The low-temperature properties after high-temperature charging storage were determined from the following discharge capacity retention rate at 0° C.

Discharge capacity retention rate (%) at 0° C. after high-temperature charging storage=(Discharge capacity at 0° C. after high-temperature charging storage)/(Initial discharge capacity at 0° C.)×100

<Gas Generation Amount after Charging Storage>

By using the coin battery after the aforementioned tests, a gas generation amount was measured by the Archimedean method. As for the gas generation amount, a relative gas generation amount was determined taking the gas generation amount of Comparative Example 3 as 100%. The battery characteristics are shown in Table 2.

TABLE 2

|  | Positive electrode No. | Constitution of negative electrode active material | | | Discharge capacity retention rate at 0° C. after charging storage (%) | Relative value of gas generation amount after charging storage (%) |
|---|---|---|---|---|---|---|
|  |  | Silicon-containing active material (% by mass of active material) (% by mass of net Si) | Carbon material (% by mass) | Binder No. (% by mass) |  |  |
| Example 1 | No. 1 | Si 60 | Artificial graphite 20 | A-1 15 | 81 | 72 |
| Example 2 |  |  | Fibrous carbon powder 5 | A-2 15 | 84 | 67 |
| Example 3 |  |  |  | A-3 15 | 82 | 68 |
| Example 4 |  |  |  | A-4 15 | 83 | 69 |
| Example 5 |  |  |  | A-2 10 + SBR 5 | 86 | 65 |
| Example 6 |  | Si 60 | Artificial graphite 20 Acetylene black 5 | A-2 15 | 80 | 71 |

TABLE 2-continued

| | | Constitution of negative electrode active material | | | Discharge capacity | Relative value of |
|---|---|---|---|---|---|---|
| | Positive electrode No. | Silicon-containing active material (% by mass of active material) (% by mass of net Si) | Carbon material (% by mass) | Binder No. (% by mass) | retention rate at 0° C. after charging storage (%) | gas generation amount after charging storage (%) |
| Example 7 | | Si 30 | Artificial graphite 55 Acetylene black 5 | A-2 10 | 85 | 64 |
| Example 8 | | SiO 50 (Net Si: 31.9) | Artificial graphite 40 Acetylene black 5 | A-2 5 | 87 | 61 |
| Comparative Example 1 | | Si 60 | Artificial graphite 20 Acetylene black 5 | C-1 15 | 63 | 89 |
| Comparative Example 2 | | | | C-2 15 | 65 | 85 |
| Comparative Example 3 | | | | C-3 15 | 59 | 100 |
| Comparative Example 4 | | | | C-4 15 | 61 | 91 |
| Comparative Example 5 | | | | C-5 15 | 20 | 109 |
| Comparative Example 6 | | SiO 50 (Net Si: 31.9) | Artificial graphite 40 Acetylene black 5 | C-3 5 | 63 | 82 |

Examples 9 to 14

Coin batteries were produced and subjected to battery evaluations in the same manners as those in Example 2, except for using each of nonaqueous electrolytic solutions as described in Table 3 in place of the nonaqueous electrolytic solution used in Example 2. The results are shown in Table 3.

TABLE 3

| | Constitution of nonaqueous electrolytic solution | | | Discharge capacity | Relative value of |
|---|---|---|---|---|---|
| | Composition of electrolyte salt | Composition of nonaqueous electrolytic solution (Volume ratio of solvent) | Additive (% by mass) | retention rate at 0° C. after charging storage (%) | gas generation amount after charging storage (%) |
| Example 2 | 1.1M LiPF$_6$ + 0.05M LiPO$_2$F$_2$ Class 1   Class 4 | EC/FEC/MEC/DEC (25/5/30/40) | None | 84 | 67 |
| Example 9 | 1.1M LiPF$_6$ + 0.05M LiPO$_2$F$_2$ Class 1   Class 4 | EC/FEC/MEC/DEC (27/3/30/40) | VC (2) | 86 | 66 |
| Example 10 | 1.1M LiPF$_6$ + 0.1M C$_2$H$_5$SO$_4$Li Class 1   Class 3 | EC/FEC/VFS/MEC/DEC (27/2/1/30/40) | VC (1) | 87 | 64 |
| Example 11 | 1.1M LiPF$_6$ + 0.1M LiSO$_3$F Class 1   Class 3 | EC/FEC/MEC/DEC (27/3/30/40) | VC (1) Hexamethylene diisocyanate (1) | 89 | 61 |
| Example 12 | 1.1M LiPF$_6$ + 0.1M LiPFO Class 1   Class 5 | EC/FEC/MEC/DEC (27/3/30/40) | VC (1) Diphenyl carbonate (1) | 86 | 63 |
| Example 13 | 1.1M LiPF$_6$ + 0.1M LiFSI Class 1   Class 2 | EC/FEC/MEC/DEC (27/3/30/40) | VC (2) 1,3-Dioxane (1) | 88 | 62 |
| Example 14 | 1.2M LiPF$_6$ Class 1 | EC/MEC/DEC (30/30/40) | None | 79 | 72 |

Examples 15 to 16 and Comparative Example 7

A positive electrode sheet of a positive electrode No. 2 was produced by using LiNi$_{0.5}$Mn$_{1.5}$O$_4$ (positive electrode active material) in place of the positive electrode active material used in Example 1. 92% by mass of LiNi$_{0.5}$Mn$_{1.5}$O$_4$ and 3% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste. This positive electrode mixture paste was applied on an aluminum foil (collector), dried, and treated under pressure, followed by cutting into a predetermined size, thereby producing a positive electrode sheet.

Furthermore, a positive electrode sheet of a positive electrode No. 3 was produced in the same manner as that in the positive No. 2, except for using polyvinylidene fluoride (PVdF) of the positive electrode No. 2 in place of the polyimide binder used in the production of the negative electrode sheet of Example 2.

Coin batteries were produced and subjected to battery evaluations in the same manners as those in Example 1, except for changing the combination of the electrodes to that as described in Table 4, changing the final charging voltage to 4.9 V and changing the final discharging voltage to 3.4 V in the battery evaluation, and changing the composition of the nonaqueous electrolytic solution to EC/PC/FEC/DEC (volume ratio: 10/10/10/70) having 1M of $LiPF_6$ and 0.05M of LiBOB dissolved therein. The results are shown in Table 4.

However, with respect to the gas generation amount after charging storage, a relative gas generation amount was determined taking the gas generation amount of Comparative Example 7 as 100%.

TABLE 4

| | Positive electrode No. | Constitution of negative electrode active material | | | Discharge capacity retention rate | Relative value of gas generation |
|---|---|---|---|---|---|---|
| | | Silicon-containing active material (% by mass of active material) | Carbon material (% by mass) | Binder No. (% by mass) | at 0° C. after charging storage (%) | amount after charging storage (%) |
| Example 15 | No. 2 | Si 60 | Artificial graphite 20 Acetylene black 5 | A-2 15 | 66 | 76 |
| Example 16 | No. 3 | Si 60 | Artificial graphite 20 Acetylene black 5 | A-2 15 | 72 | 69 |
| Comparative Example 7 | No. 2 | Si 60 | Artificial graphite 20 Acetylene black 5 | C-3 15 | 44 | 100 |

From Tables 2 to 4, all of the lithium secondary batteries of Examples 1 to 16 using the polyimide binders for energy storage device of the present invention (A-1 to A-4) for the negative electrode sheet of the lithium secondary battery are conspicuously improved in battery characteristics in a broad temperature range as compared with the lithium secondary batteries of Comparative Examples 1 to 7 using the binders of the Comparative Examples (C-1 to C-5). It has become clear that the aforementioned effect is a peculiar effect to the polyimide binder for energy storage device obtained by using the aqueous solution of the polyamic acid composed of the repeating unit represented by the general formula (I).

In addition, in Table 3, in view of the fact that the battery characteristics of Example 2 and Examples 9 to 13 are improved as compared with those of Example 14, it is noted that, by combining the specified lithium salts, using the fluorine-containing compound for the solvent, or using the specified additive(s) in the nonaqueous electrolytic solution, the effect to be brought by the polyimide binder for energy storage device of the present invention is much more increased.

Furthermore, in Table 4, from the comparison between Example 16 and Example 15, it is noted that even when the polyimide binder for energy storage device of the present invention is used for the positive electrode, it has the effect for conspicuously improving the battery characteristics in a broad temperature range.

INDUSTRIAL APPLICABILITY

By using the polyimide binder for energy storage device of the present invention, an energy storage device having excellent electric properties in a broad temperature range can be obtained. In particular, when the polyimide binder for energy storage device of the present invention is used as a polyimide binder for an energy storage device to be mounted in a device that is highly possibly used at high temperatures, e.g., a hybrid electric vehicle, a plug-in hybrid electric vehicle, a battery electric vehicle, a tablet terminal, an ultrabook, etc., an energy storage device whose electric properties are hardly worsened in a broad temperature range can be obtained.

In addition, since the polyimide binder for energy storage device of the present invention is obtained through an imidization reaction of an aqueous solution of a polyamic acid having a specified structure, it is excellent in environmental adaptability.

Furthermore, the polyimide binder for energy storage device of the present invention can also be utilized as a binder for materials other than the binder for energy storage device, such as a nonaqueous electrolytic solution for primary battery, a nonaqueous electrolytic solution for electrolysis, a nonaqueous electrolytic solution for electroplating, etc.

The invention claimed is:

1. A polyimide binder for energy storage device, comprising:

a polyimide produced by a process comprising subjecting an aqueous solution of a polyamic acid to an imidization reaction, wherein the polyamic acid is produced by reacting at least one tetracarboxylic acid component selected from the group consisting of an aromatic tetracarboxylic dianhydride not containing a fluorine group, an aliphatic tetracarboxylic dianhydride, and an aromatic tetracarboxylic dianhydride containing a fluorine group and at least one diamine component selected from the group consisting of an aromatic diamine not containing a fluorine group and having a solubility in water of 25° C. of 0.1 g/L or more, an aliphatic diamine having a molecular weight of 500 or less, and an aromatic diamine containing a fluorine group, such that the polyamic acid has a repeating unit of formula (I)

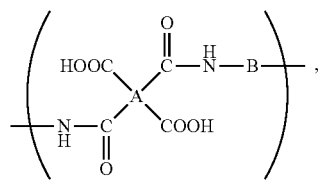

wherein
A is a residue of the tetracarboxylic acid component,
B is a residue of the diamine component,
55 mol % or more of B in a total amount of the repeating unit is derived from the aliphatic diamine having a molecular weight of 500 or less, and
the polyimide has a tensile elastic modulus of from 1.5 GPa to 2.7 GPa.

2. The polyimide binder of claim 1, wherein the aqueous solution of the polyamic acid is produced by reacting the at least one tetracarboxylic acid component and the at least one diamine component by using water as a reaction solvent in the presence of an imidazole.

3. The polyimide binder of claim 2, wherein the tetracarboxylic acid component is at least one selected from the group consisting of 4,4'-oxydiphthalic dianhydride, 4,4'-(hexafluoroisopropylidene)diphthalic anhydride, 1,2,4,5-cyclohexane tetracarboxylic acid-1,2:4,5-dianhydride, and dicyclohexyl-3,3',4,4'-tetracarboxylic dianhydride.

4. The polyimide binder of claim 2, wherein the diamine component is at least one selected from the group consisting of p-phenylenediamine, 4,4'-diaminodiphenyl ether, trans-1,4-diaminocyclohexane, cis-1,4-diaminocyclohexane, 1,6-hexamethylenediamine, and 1,4-bis(aminomethyl)cyclohexane.

5. The polyimide binder of claim 2, wherein the imidazole is at least one selected from the group consisting of 1,2-dimethylimidazole, 2-ethyl-4-methylimidazole, 4-ethyl-2-methylimidazole, and 1-methyl-4-ethylimidazole.

6. The polyimide binder of claim 2, wherein the reacting of the at least one tetracarboxylic acid component and the at least one diamine component is carried out such that the aqueous solution of the polyamic acid comprises the imidazole in an amount of 1.6 molar times or more relative to an amount of the tetracarboxylic acid component of the polyamic acid.

7. The polyimide binder of claim 1, wherein the imidization reaction is performed at an imidization temperature of from 120° C. to 200° C.

8. A negative electrode sheet for energy storage device, comprising:
a copper collector having a negative electrode active material layer formed on a surface of the copper collector,
wherein the negative electrode active material layer is formed by a process comprising casting or applying a negative electrode mixture comprising the polyimide binder for energy storage device of claim 1, a silicon-containing negative electrode active material, and a carbon material on the surface of the copper collector.

9. A positive electrode sheet for energy storage device, comprising:
an aluminum collector having a positive electrode active material layer formed on a surface of the aluminum collector,
wherein the positive electrode active material layer is formed by a process comprising casting or applying a positive electrode mixture comprising the polyimide binder for energy storage device of claim 1, a carbon material, and a lithium transition metal oxide on the surface of the aluminum collector, and
the lithium transition metal oxide comprises a nickel atom and a manganese atom in a total amount of from 50 atomic % to 100 atomic % of all metal elements other than a lithium atom.

10. An energy storage device, comprising:
a positive electrode;
a negative electrode comprising the negative electrode sheet of claim 8; and
a nonaqueous electrolytic solution comprising an electrolyte salt dissolved in a nonaqueous solvent.

11. The energy storage device of claim 10, wherein the nonaqueous electrolytic solution comprises a fluorine-containing compound.

12. The energy storage device of claim 11, wherein the fluorine-containing compound is at least one selected from the group consisting of 4-fluoro-1,3-dioxol an-2-one, trans- or cis-4,5-difluoro-1,3-dioxol an-2-one, and vinyl sulfonyl fluoride.

13. The energy storage device of claim 10, wherein the electrolyte salt comprises $LiPF_6$ and at least one lithium salt selected from the group consisting of $LiPO_2F_2$, $LiSO_3F$, $C_2H_5SO_4Li$, $LiN(SO_2F)_2$, lithium difluoro[oxalate-O,O']borate, lithium difluorobis[oxalate-O,O']phosphate, and lithium tetrafluoro[oxalate-O,O']phosphate, and
the at least one lithium salt is included in an amount of from 0.001 M to 0.4 M in the nonaqueous electrolytic solution.

14. The energy storage device of claim 10, wherein the nonaqueous electrolytic solution comprises at least one selected from the group consisting of vinylene carbonate, vinyl ethylene carbonate, 4-ethynyl-1,3-dioxolan-2-one, hexamethylene diisocyanate, methyl phenyl carbonate, diphenyl carbonate, and 1,3-dioxane in an amount of from 0.001% by mass or more to 5% by mass.

15. An energy storage device, comprising:
a polyimide binder having a tensile elastic modulus of from 1.5 GPa to 2.7 GPa and produced by a process comprising subjecting an aqueous solution of a polyamic acid to an imidization reaction, the polyamic acid produced by reacting at least one tetracarboxylic acid component selected from the group consisting of an aromatic tetracarboxylic dianhydride not containing a fluorine group, an aliphatic tetracarboxylic dianhydride, and an aromatic tetracarboxylic dianhydride containing a fluorine group and at least one diamine component selected from the group consisting of an aromatic diamine not containing a fluorine group and having a solubility in water of 25° C. of 0.1 g/L or more, an aliphatic diamine having a molecular weight of 500 or less, and an aromatic diamine containing a fluorine group, such that the polyamic acid has a repeating unit of formula (I)

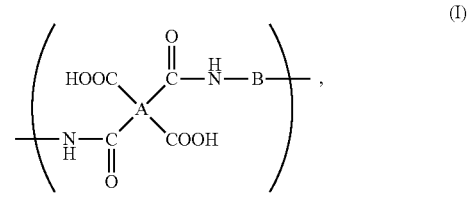

wherein
A is a residue of the tetracarboxylic acid component,
B is a residue of the diamine component, and
55 mol % or more of B in a total amount of the repeating unit is derived from the aliphatic diamine having a molecular weight of 500 or less.

16. A method for improving an electrical property of an energy storage device, comprising:
   including the polyimide binder of claim 1 in the energy storage device.

17. The energy storage device of claim 11, wherein the nonaqueous electrolytic solution comprises the fluorine-containing compound in an amount of from 0.07% by volume to 35% by volume relative to a total volume of the nonaqueous solvent.

18. The energy storage device of claim 10, wherein the nonaqueous electrolytic solution further comprises an unsaturated bond-containing cyclic carbonate, an isocyanate compound, a phenyl carbonate compound, and a cyclic acetal compound.

19. The polyimide binder of claim 3, wherein the diamine component of the polyamic acid is at least one selected from the group consisting of p-phenylenediamine, 4,4'-diaminodiphenyl ether, trans-1,4-diaminocyclohexane, cis-1,4-diaminocyclohexane, 1,6-hexamethylenediamine, and 1,4-bis(aminomethyl)cyclohexane.

20. The polyimide binder of claim 3, wherein the diamine component is at least one selected from the group consisting of p-phenylenediamine, 4,4'-diaminodiphenyl ether, trans-1,4-diaminocyclohexane,cis-1,4-diaminocyclohexane, 1,6-hexamethylenediamine, and 1,4-bis(aminomethyl)cyclohexane, and
   the imidazole is at least one selected from the group consisting of 1,2-dimethylimidazole, 2-ethyl-4-methylimidazole, 4-ethyl-2-methylimidazole, and 1-methyl-4-ethylimidazole.

* * * * *